US008620580B2

(12) United States Patent
Alanen et al.

(10) Patent No.: US 8,620,580 B2
(45) Date of Patent: Dec. 31, 2013

(54) METHODS AND APPARATUSES FOR ASSISTED NAVIGATION SYSTEMS

(75) Inventors: Kimmo Alanen, Lempaala (FI); Lauri Wirola, Tampere (FI); Jari Syrjarinne, Tampere (FI)

(73) Assignee: Nokia Corporation, Espoo (FI)

( * ) Notice: Subject to any disclaimer, the term of this patent is extended or adjusted under 35 U.S.C. 154(b) by 557 days.

(21) Appl. No.: 11/574,485

(22) PCT Filed: Feb. 28, 2006

(86) PCT No.: PCT/FI2006/050084
§ 371 (c)(1),
(2), (4) Date: Feb. 28, 2007

(87) PCT Pub. No.: WO2007/099196
PCT Pub. Date: Sep. 7, 2007

(65) Prior Publication Data
US 2009/0228209 A1    Sep. 10, 2009

(51) Int. Cl.
*G01C 21/00* (2006.01)
*G01S 1/00* (2006.01)
*G01S 5/02* (2010.01)

(52) U.S. Cl.
USPC ........... 701/468; 701/400; 701/412; 701/471; 701/531; 455/456.1; 455/456.6

(58) Field of Classification Search
USPC ......... 701/200, 400, 408, 412, 468, 470, 471, 701/476, 478, 531; 455/456.1–456.6, 550; 342/357.01, 357.06, 357.09, 357.1, 342/357.12, 357.13, 357.15
See application file for complete search history.

(56) References Cited

U.S. PATENT DOCUMENTS

| 6,389,291 | B1 | 5/2002 | Pande et al. |
| 6,429,811 | B1 * | 8/2002 | Zhao et al. ............... 342/357.66 |
| 6,861,980 | B1 | 3/2005 | Rowitch et al. |
| 7,242,348 | B2 | 7/2007 | Nagahara |

(Continued)

FOREIGN PATENT DOCUMENTS

| EP | 1617231 A1 | 1/2006 |
| JP | 2004519892 A | 7/2004 |

(Continued)

OTHER PUBLICATIONS

European Search Report dated Dec. 10, 2009.

(Continued)

*Primary Examiner* — Rami Khatib
(74) *Attorney, Agent, or Firm* — Locke Lord LLP

(57) ABSTRACT

The invention relates to a navigation systems and elements. A network element (M) includes a receiver (M.2.2) for forming assistance data relating to at least one navigation system. The network element (M) inserts indication of the navigation system and a selected mode into the assistance data and constructs the assistance data according to the selected mode. The network element (M) has a transmitting element (M.3.1) for transmitting the assistance data via a communications network (P) to a device (R). The device (R) includes a positioning receiver (R.3) for performing positioning on the basis of one or more signals of the at least one satellite navigation system; a receiver (R.2.2) for receiving the assistance data from the network element (M); and an examining element (R.1.1) adapted to examine the received assistance data. The assistance data is adapted to be used by the positioning receiver for performing positioning of the device (R).

11 Claims, 6 Drawing Sheets

(56) References Cited

U.S. PATENT DOCUMENTS

| | | | |
|---|---|---|---|
| 7,362,265 B2* | 4/2008 | Weill | 342/357.25 |
| 7,688,260 B2* | 3/2010 | Pomerantz et al. | 342/357.43 |
| 2002/0168985 A1 | 11/2002 | Zhao et al. | |
| 2002/0190898 A1* | 12/2002 | Abraham et al. | 342/357.09 |
| 2003/0011513 A1 | 1/2003 | Zhao et al. | |
| 2003/0234738 A1* | 12/2003 | Orler et al. | 342/357.06 |
| 2005/0090265 A1 | 4/2005 | Abraham | |
| 2005/0114022 A1 | 5/2005 | Podshivalov et al. | |
| 2006/0234818 A1 | 10/2006 | Wilson | |

FOREIGN PATENT DOCUMENTS

| | | |
|---|---|---|
| JP | 200602914 A | 2/2006 |
| RU | 2073913 C1 | 2/1997 |
| WO | 0184176 A1 | 11/2001 |
| WO | 02067462 A1 | 8/2002 |
| WO | 2004001439 A1 | 12/2003 |
| WO | 2005008273 A1 | 1/2005 |
| WO | 2005022189 A2 | 3/2005 |
| WO | WO2005071430 | 8/2005 |

OTHER PUBLICATIONS

"3rd Generation Partnership Project; Technical Specification Group Services and System Aspects; Location Services (LCS); Study into Applicability of GALILEO in LCS Release 6; 3GPP TR 23.835" Jun. 1, 2003, ETSI Standards, LIS, Sophia Antipolis Cedex, France, XP014021948, ISSN: 0000-0001.

"3rd Generation Partnership Project; Technical Specification Group GSM EDGE Radio Access Network; Location Services (LCS); Broadcast Network Assistance for Enhanced Observed Time Difference (E-OTD) and Global Positioning System (gps) Positioning Methods (Release) 1999" 3GPP TS 04.35 V8.3.0, XX, XX, Jan. 1, 2001, pp. 1-35, XP002280213 p. 19-p. 26 , p. 34 .

Russian Search Report dated Dec. 4, 2009.
Translated Russian Search Report dated Dec. 4, 2009.
Australian Patent Search Report and written Opinion dated Sep. 21, 2009.
Canadian Office Action dated Aug. 8, 2011.
Japanese Office Action dated Aug. 1, 2011.
Office Action received from corresponding European Patent Application No. 06809372.3, dated Sep. 7, 2009, 4 pages.
Office Action received from corresponding European Patent Application No. 07700667.4, dated Nov. 18, 2009, 5 pages.
Office Action received from corresponding European Patent Application No. 06809372.3, dated Apr. 30, 2010, 4 pages.
International Search Report and Written Opinion received in corresponding Patent Cooperation Treaty Application No. PCT/IB2007/050226, Jun. 25, 2007, 12 pages.
3GPP TR 23.835 v.1.0.0, "3rd Generation Partnership Project", ETSI Standards, European Telecommunications Standards Institute, Jun. 2003, 34 pages.
Monnerat, Michel, et al., "The Assisted GNSS, Technology and Applications", International Technical Meeting of the Satellite Division of the Institute of Navigation, Washington, D.C., Sep. 21, 2004, pp. 2479-2488.
Schmid Andreas, et al., "Combined Galileo/GPS Architecture for Enhanced Sensitivity Reception", AEU International Journal of Electronics and Communications, vol. 59, No. 5, Jul. 15, 2005, pp. 297-306.
International Search Report and Written Opinion received in corresponding Patent Cooperation Treaty Application No. PCT/IB2007/053419, Jun. 1, 2007, 9 pages.
Leonard, Arian, et al., "GPS and Galileo Interoperability and Synergies", Proceedings of the 15th International Technical Meeting of the Satellite Division of the Institute of Navigation, Sep. 27, 2002, pp. 330-341.
Chinese Office Action dated Jun. 2, 2011.
International Search Report and Written Opinion of the International Searching Authority for PCT Application No. PCT/IB2007/050226 dated Jun. 25, 2007 (Corrected), 16 pages.
3rd Generation Partnership Project ETSI Standards, European Telecommunications Standards Institute,Version V100, Jun. 2003, Section 5-6.
Office Action received from Australian Patent Application No. 2006339343, dated May 24, 2010, 10 pages.
Office Action received from Chinese Patent Application No. 200680053513.2, dated Apr. 26, 2011, 12 pages.
Extended Search Report received in European Patent Application No. 11165706.0, dated Jul. 29, 2011.
Office Action received from Korean Application No. 2008-7023201, dated Aug. 31, 2010, 6 pages.
Office Action received from Mexican Application No. MX/a/2008/011033, dated Oct. 28, 2010, 3 pages.
Office Action received from Russian Application No. 2008138467/09, dated May 19, 2009, 8 pages.
International Search Report and Written Opinion of the International Searching Authority for PCT Application No. PCT/FI2006/050084 dated Sep. 11, 2006, 10 pages.
European Space Agency ESA, "Specification of Galileo and Giove Space Segment Properties Relevant for Satellite Laser Ranging", Jul. 7, 2006.
Extended Search Report received in European Patent Application No. 06708988.8, dated Dec. 17, 2009.
Ukrainian Notice of Allowability dated Jan. 12, 2011.
Singapore Examination Report with mailing date of Jun. 23, 2010.

\* cited by examiner

METHODS AND APPARATUSES FOR ASSISTED NAVIGATION SYSTEMS

This application is the National Stage of International Application No. PCT/FI2006/050084, International Filing Date, 28 Feb. 2006, which designated the United States of America.

FIELD OF THE INVENTION

This invention relates to a field of assisted navigation systems and more specifically to a format, in which assistance data is distributed from a communications network to terminals. The invention also relates to a device comprising a positioning receiver for performing positioning on the basis of one or more signals of a satellite navigation system. The invention also relates to a network element comprising a transmitter for transmitting assistance data of a satellite navigation system to a receiver. The invention further relates to a method, a computer program product and a signal for delivering assistance data of a satellite navigation system to a positioning receiver.

BACKGROUND OF THE INVENTION

One known navigation system is the GPS system (Global Positioning System) which presently comprises more than 24 satellites, of which usually a half of them are simultaneously within the sight of a receiver. These satellites transmit e.g. Ephemeris data of the satellite, as well as data on the time of the satellite. A receiver used in positioning normally deduces its position by calculating the propagation time of signals received simultaneously from several satellites belonging to the positioning system to the receiver and calculates the time of transmission (ToT) of the signals. For the positioning, the receiver must typically receive the signal of at least four satellites within sight to compute the position. The other already launched navigation system is the Russian-based GLONASS (Global'naya Navigatsionnaya Sputnikovaya Sistema).

In the future, there will also exist other satellite based navigation systems than GPS and GLONASS. In the Europe the Galileo system is under construction and will be operational within a few years. Space Based Augmentation Systems SBAS (Wide Area Augmentation System WMS, European Geostationary Navigation Overlay Service EGNOS, GPS Aided GEO Augmented Navigation GAGAN) are also being ramped up. Local Area Augmentation Systems LAAS, which uses fixed navigation stations on the ground, are becoming more common. Strictly speaking, the Local Area Augmentation Systems are not actually satellite based navigation systems although the navigation stations are called as "pseudo satellites" or "pseudolites". The navigation principles applicable with the satellite based systems are also applicable with the Local Area Augmentation Systems. Pseudolite signals can be received with a standard GNSS (Global Navigation Satellite System) receiver. Moreover, Japanese are developing their own GPS/Galileo complementing system called Quasi-Zenith Satellite System QZSS.

The satellite based navigation systems, including systems using pseudo satellites, can collectively be called as Global Navigation Satellite Systems (GNSS). In the future there will probably be positioning receivers which can perform positioning operations using, either simultaneously or alternatively, more than one navigation system. Such hybrid receivers can switch from a first system to a second system if e.g. signal strengths of the first system fall below a certain limit, or if there are not enough visible satellites of the first system, or if the constellation of the visible satellites of the first system is not appropriate for positioning. Simultaneous use of different systems comes into question in challenging conditions, such as urban areas, where there is limited number of satellites in view. In such cases, navigation based on only one system is practically impossible due to the low availability of signals. However, hybrid use of different navigation systems enables navigation in these difficult signal conditions.

Each satellite of the GPS system transmits a ranging signal at a carrier frequency of 1575.42 MHz called L1. This frequency is also indicated with $154f_0$, where $f_0=10.23$ MHz. Furthermore, the satellites transmit another ranging signal at a carrier frequency of 1227.6 MHz called L2, i.e. $120f_0$. In the satellite, the modulation of these signals is performed with at least one pseudo random sequence. This pseudo random sequence is different for each satellite. As a result of the modulation, a code-modulated wideband signal is generated. The modulation technique used makes it possible in the receiver to distinguish between the signals transmitted from different satellites, although the carrier frequencies used in the transmission are substantially the same. Doppler effect results in a small (±1 kHz) change in the carrier frequency depending upon the constellation geometry. This modulation technique is called code division multiple access (CDMA). In each satellite, for modulating the L1 signal, the pseudo sequence used is e.g. a so-called C/A code (Coarse/Acquisition code), which is a code from the family of the Gold codes. Each GPS satellite transmits a signal by using an individual C/A code. The codes are formed as a modulo-2 sum of two 1023-bit binary sequences. The first binary sequence G1 is formed with a polynomial $X^{10}+X^3+1$, and the second binary sequence G2 is formed by delaying the polynomial $X^{10}+X^9+X^8+X^6+X^3+X^2+1$ in such a way that the delay is different for each satellite. This arrangement makes it possible to produce different C/A codes with an identical code generator. The C/A codes are thus binary codes whose chipping rate in the GPS system is 1.023 MHz. The C/A code comprises 1023 chips, wherein the code epoch is 1 ms. The L1 carrier signal is further modulated with navigation information at a bit rate of 50 bit/s. The navigation information comprises information about the health of the satellite, its orbit, time data, etc.

In the GPS system, satellites transmit navigation messages including Ephemeris data and time data, which are used in the positioning receiver to determine the position of the satellite at a given instant. These Ephemeris data and time data are transmitted in frames which are further divided into subframes. FIG. 6 shows an example of such a frame structure FR. In the GPS system, each frame comprises 1500 bits which are divided into five subframes of 300 bits each. Since the transmission of one bit takes 20 ms, the transmission of each subframe thus takes 6 s, and the whole frame is transmitted in 30 seconds. The subframes are numbered from 1 to 5. In each subframe 1, e.g. time data is transmitted, indicating the moment of transmission of the subframe as well as information about the deviation of the satellite clock with respect to the time in the GPS system.

The subframes 2 and 3 are used for the transmission of Ephemeris data. The subframe 4 contains other system information, such as universal time, coordinated (UTC). The subframe 5 is intended for the transmission of almanac data on all the satellites. The entity of these subframes and frames is called a GPS navigation message which comprises 25 frames, or 125 subframes. The length of the navigation message is thus 12 min 30 s.

In the GPS system, time is measured in seconds from the beginning of a week. In the GPS system, the moment of beginning of a week is midnight between a Saturday and a Sunday. Each subframe to be transmitted contains information on the moment of the GPS week when the subframe was transmitted. Thus, the time data indicates the moment of transmission of a certain bit, i.e. in the GPS system, the moment of transmission of the last bit in the subframe. In the satellites, time is measured with high-precision atomic chronometers. In spite of this, the operation of each satellite is controlled in a control centre for the GPS system (not shown), and e.g. a time comparison is performed to detect chronometric errors in the satellites and to transmit this information to the satellite.

The number of satellites, the orbital parameters of the satellites, the structure of the navigation messages, etc. may be different in different navigation systems. Therefore, the operating parameters of a GPS based positioning receiver may not be applicable in a positioning receiver of another satellite system. On the other hand, at least the design principles of the Galileo has indicated that there will be some similarities between GPS and Galileo in such a way that at least Galileo receiver should be able to utilize GPS satellite signals in positioning.

Positioning devices (or positioning receivers) i.e. devices which have the ability to perform positioning on the basis of signals transmitted in a navigation system can not always receive strong enough signals from the required number of satellites. For example, it may occur that when a three-dimensional positioning should be performed by the device, it can not receive signals from four satellites. This may happen indoors, in urban environments, etc. Methods and systems have been developed for communications networks to enable position in adverse signal conditions. If the communications network only provides navigation model assistance to the receiver, the requirement for a minimum of three signals in two-dimensional positioning, or four signals in three-dimensional positioning does not diminish. However, if the network provides, for instance, barometric assistance, which can be used for altitude determination, then three satellites is enough for three-dimensional positioning. These so called assisted navigation systems utilise other communication systems to transmit information relating to satellites to the positioning devices. Respectively, such positioning devices which have the ability to receive and utilize the assistance data can be called as assisted GNSS receivers, or more generally, assisted positioning devices.

Currently, only assistance data relating to GPS satellites can be provided to assisted GNSS receivers in CDMA (Code Division Multiple Access), GSM (Global System for Mobile communications) and W-CDMA (Wideband Code Division Multiple Access) networks. This assistance data format closely follows the GPS navigation model specified in the GPS-ICD-200 SIS (ICD, Interface Control Document; SIS, Signal-In-Space) specification. This navigation model includes a clock model and an orbit model. To be more precise, the clock model is used to relate the satellite time to the system time, in this case the GPS time. The orbit model is used to calculate the satellite position at a given instant. Both data are essential in satellite navigation.

The availability of the assistance data can greatly affect the positioning receiver performance. In the GPS system, it takes at least 18 seconds (the length of the first three subframes) in good signal conditions for a GPS receiver to extract a copy of the navigation message from the signal broadcasted by a GPS satellite. Therefore, if no valid copy (e.g. from a previous session) of a navigation model is available, it takes at least 18 seconds before the GPS satellite can be used in position calculation. Now, in AGPS receivers (Assisted GPS) a cellular network such as GSM or UMTS (Universal Mobile Telecommunications System) sends to the receiver a copy of the navigation message and, hence, the receiver does not need to extract the data from the satellite broadcast, but can obtain it directly from the cellular network. The time to first fix (TTFF) can be reduced to less than 18 seconds. This reduction in the time to first fix may be crucial in, for instance, when positioning an emergency call. This also improves user experience in various use cases, for example when the user is requesting information of services available nearby the user's current location. These kinds of Location Based Services (LBS) utilize in the request the determined location of the user. Therefore, delays in the determination of the location can delay the response(s) from the LBS to the user.

Moreover, in adverse signal conditions the utilization of the assisted data may be the only option for navigation. This is because a drop in the signal power level may make it impossible for the GNSS receiver to obtain a copy of the navigation message. However, when the navigation data is provided to the receiver from an external source (such as a cellular network), navigation is enabled again. This feature can be important in indoor conditions as well as in urban areas, where signal levels may significantly vary due to buildings and other obstacles, which attenuate satellite signals.

The international patent application publication WO 02/67462 discloses GPS assistance data messages in cellular communications networks and methods for transmitting GPS assistance data in cellular networks.

When a mobile terminal having an assisted positioning receiver requests for assistance data, the network sends the mobile terminal one navigation model for each satellite in the view of the assisted positioning receiver. The format in which the assistance data is sent is specified in various standards. Control Plane solutions include RRLP (Radio Resource Location Services Protocol) in GSM, RRC (Radio Resource Control) in W-CDMA and IS-801.1/IS-801.A in CDMA. Broadcast assistance data information elements are defined in the standard TS 44.035 for GSM. Finally, there are User Plane solutions OMA SUPL 1.0 (Open Mobile Alliance, Secure User Plane for Location) and various proprietary solutions for CDMA networks. The common factor for all these solutions is that they only support GPS.

However, due to the ramp up of Galileo, all the standards shall be modified in the near future in order to achieve Galileo compatibility.

Hence, it is clear that GPS assistance alone will not be adequate in the near future and a new data format must be developed in order to be able to support the new systems.

The problem in providing assistance data for new systems, as well as to GPS, can be reduced to finding a navigation model (clock and orbit model) that can be used to describe all the satellite systems. A straightforward solution is to take the native navigation message format for each of the systems and use this format. However, this would result in various different messages (different message format for each system) which would make the implementation task problematic. Moreover, the native format may also be incompatible with cellular standards. Therefore, the final solution must be such that various different formats are not required.

The challenges in developing a common format include firstly satellite indexing. The satellite index is used to identify the navigation model with a specific satellite. The problem is that every system has its own indexing method.

GPS indexes satellites (SV, Space Vehicle) based on PRN (Pseudo-Random Noise) numbers. The PRN number can be identified with the CDMA spread code used by the satellites.

Galileo uses a 7-bit field (1-128) to identify the satellite. The number can be identified with the PRN code used by the satellite.

GLONASS uses a 5-bit field to characterize satellites. The number can be identified with the satellite position in the orbital planes (this position is called a "slot"). Moreover, in contrast to other systems, GLONASS uses FDMA (Frequency Division Multiple Access) to spread satellite broadcasts in spectrum. It is noted here that there is also a CDMA spread code in use in the GLONASS. There is, therefore, a table that maps the satellite slot number to the broadcast frequency. This map must be included in any assistance data format.

SBAS systems use PRN numbers similar to GPS, but they have an offset of 120. Therefore, the first satellite of the SBAS system has a satellite number of 120.

Since QZSS SIS ICD is not public yet, there is no detailed information on the satellite indexing in the system. However, since the system is a GPS augmentation, the GPS compatible format should at high probability be compatible with QZSS as well.

Pseudolites (LAAS, Local Area Augmentation System) are the most problematic in the indexing sense. There is no standard defined for indexing pseudolites currently. However, the indexing should at least loosely follow the GPS-type indexing, since they use GPS-type PRNs. Therefore, by ensuring that the range of satellite indices is sufficient, it should be possible to describe LAAS transmitters with GPS-type satellite indexing.

The second challenge is the clock model. The clock model for any system is given by $$t_{SYSTEM}(t) = t_{SV}(t) - [a_0 + a_1 \cdot (t_{SYSTEM}(t) - t_{REFERENCE}) + a_2 \cdot (t_{SYSTEM}(t) - t_{REFERENCE})^2]$$

where $t_{SYSTEM}(t)$ is the system time (for instance, GPS time) at instant t, $t_{SV}(t)$ satellite time at instant t, $t_{REFERENCE}$ is the model reference time and $a_i$ (i∈{0,1,2}) are the $0^{th}$, $1^{st}$ and $2^{nd}$ order model coefficients, respectively. Relativistic correction term is not shown in the equation. Since the equation is the same for each system, the only problem in developing the generalized model is to find such bit counts and scale factors that the [1)]range of values required by each system is covered and the [2)]accuracy (or resolution) requirements for each system are met.

The third problem includes the orbit model. Again, each system has its own format (excluding GPS and Galileo that use the same format). GPS and Galileo use Keplerian orbit parameter set: 6 orbit parameters, 3 linear correction terms as well as 6 harmonic gravitation correction terms. In contrast to GPS and Galileo, GLONASS navigation model only contains information on the satellite position, velocity and acceleration at a given instant. This information can then be used (by solving an initial value problem for the equations of motion) to predict the satellite position at some instant. SBAS utilizes in some sense format similar to GLONASS. The SBAS navigation message includes information on the satellite position, velocity and acceleration in ECEF (Earth-Centered Earth Fixed coordinate system definition) systems at a given instant. This data is used to predict the satellite position by simple extrapolation, which is in contrast with GLONASS, in which equations of motion are integrated in time. Again, since the QZSS ICD is not available yet, the detailed format of the navigation message is not known. However, there are documents that quote the QZSS signal being compatible with either GPS-type ephemeris or SBAS-type broadcast. Hence, ensuring that the new format is compatible with GPS and SBAS, the QZSS orbits may be described using the format of GPS. LAAS require that the orbit model is able to describe objects that are stationary in the ECEF-frame. Also, pseudolites have fairly strict resolution requirements for the position. It is necessary to be able to describe a pseudolite position at a resolution of about 5 mm in some cases.

In addition to these requirements (indexing, clock model and orbit model), the navigation model must include information on model reference time ($t_{REFERENCE}$ in the clock model, similar time stamp is required for the orbit model), model validity period, issue of data (in order to be able differentiate between model data sets), and SV health (indicates whether navigation data from the SV is usable or not).

Needless to say, almost all the systems have their own method of expressing these items. The range and accuracy requirements vary from system to system. Moreover, the current satellite health field requires modification, since in the future GPS (and other systems) do not transmit only one signal, but various signals at different frequencies.

Now, the new assistance data format must be such that all the system specific items as well as parameter range and accuracy requirements are taken into account.

Finally, the problem with current assistance data format is that it only allows for one set of navigation data to be available for a given satellite. This means that when the navigation model is updated, the terminal must be provided with a new set of data. However, already now there are commercial services that provide navigation data that is valid for 5-10 days. The navigation model validity time does not increase, but the service sends multiple sets of navigation data for one satellite. In assisted GNSS this is advantageous, since the user receives all the assistance needed for the next couple of weeks in a single download. The new assistance data format must, therefore, be able to support these long-term orbit fits in current models.

To this date there has been no solution to the problem. This is because the assistance data distribution has been limited to GPS-system and to CDMA-networks.

The current solution in distributing assistance data to the terminals is to obtain navigation model for GPS directly from the satellite broadcasts, modify these data and distribute it to terminals in the network according to various standards in use.

SUMMARY OF THE INVENTION

The current invention includes a generalized navigation model, which can be used to characterize the satellite clock behaviour and the satellite orbit in more than one navigation system. The generalized navigation model can be used at least with GPS, Galileo, GLONASS, SBAS, LAAS and QZSS. There are also reservations for yet unknown future systems.

The indexing problem has been solved by extending the satellite index field in such a way that the upper bits of the field define the navigation system (GPS, Galileo, GLONASS, SBAS, LAAS, QZSS or some future system) and the lower bits express the satellite index in the system native format. The field shall be called SS index from now on to denote "System and Satellite". There is also a GLONASS specific addition that allows for mapping the SS index to the satellite broadcast frequency (or channel).

The clock model problem has been solved by finding such bit counts and scale factors for the coefficients that the clock models in all the systems can be described by using the generalized clock model. However, the invention does not exclude using different clock models for each system.

The orbit model problem has been solved by introducing a multi-mode model. The modes of the model are, for instance, Mode 1: Keplerian model; Mode 2: Position in ECEF-coordinates; and Mode 3: Position, velocity and acceleration in ECEF-coordinates. More modes may be added, if such a need arises. An example embodiment, of the idea is that the upper bits of the SS index (i.e. system) define the model mode. However, also other implementations can be used to indicate the model mode, for example by using a mode index. The modes are mutually exclusive.

Long-term orbit fits do not require anything special. The reference time and validity period define precisely, when the model can be used. If long-term data is available, the network provides the terminal with the long-term data and it is the responsibility of the terminal to take care of storing and handling multiple sets of navigation data for the same satellite (or SS index). However, if the navigation model is not based on the broadcasted navigation model, but is long-term data, this could be indicated, for example, in the Issue-of-Data field, but also other implementations are possible.

According to a first aspect of the present invention there is provided a device comprising
    a positioning receiver for performing positioning on the basis of one or more signals of at least one satellite navigation system;
    a receiver for receiving assistance data relating to at least one navigation system; and
    an examining element adapted to examine the received assistance data;
characterised in that the device further comprises
    a determining element adapted to determine the mode of the assistance data in said assistance data, wherein said assistance data is adapted to be used by the positioning receiver for performing positioning of the device.

According to a second aspect of the present invention there is provided a network element comprising
    a controlling element for forming assistance relating to at least one navigation system; and
    a transmitting element for transmitting assistance data to a communications network;
characterised in that the controlling element is adapted to
    select a mode for the transmission of the assistance data;
    insert indication of the navigation system and the selected mode into the assistance data; and
    construct the assistance data according to the selected mode.

According to a third aspect of the present invention there is provided a system comprising:
    network element which comprises
        a controlling element for forming assistance data relating to at least one navigation system; and
        a transmitting element for transmitting the assistance data to a communications network;
    a device which comprises
        a positioning receiver for performing positioning on the basis of one or more signals of said at least one satellite navigation system;
        a receiver for receiving assistance data from the network element; and
        an examining element adapted to examine the received assistance data;
characterised in that the controlling element is adapted to
    select a mode for the transmission of the assistance data;
    insert indication of the navigation system and the selected mode into the assistance data; and
    construct the assistance data according to the navigation system;
and that the device further comprises
    a determining element adapted to determine the mode of the assistance data in said assistance data, wherein said assistance data is adapted to be used by the positioning receiver for performing positioning of the device.

According to a fourth aspect of the present invention there is provided a module for a device comprising a positioning receiver for performing positioning on the basis of one or more signals of at least one satellite navigation system; said module comprising
    a receiving element for receiving assistance data relating to at least one navigation system;
    an examining element adapted to examine the received assistance data;
characterised in that the module further comprises
    a determining element adapted to determine the mode of the assistance data in said assistance data, and
    an output to transfer indication on the mode of the assistance data to the positioning receiver,
    wherein said assistance data is adapted to be used by the positioning receiver for performing positioning of the device.

According to a fifth aspect of the present invention there is provided a method for transmitting assistance data to a device, the method comprising:
    forming assistance data relating to at least one navigation system; and
    transferring assistance data to the device;
characterised in that the method further comprises
    determining the navigation system the navigation data relates to;
    selecting a mode for transmitting the assistance data;
    inserting an indication of the navigation system and the selected mode into the assistance data; and
    constructing the assistance data according to the selected mode.

According to a sixth aspect of the present invention there is provided a computer program product for storing computer program having computer executable instructions for
    forming assistance data relating to at least one navigation system; and
    transmitting assistance data to a device;
characterised in that the computer program further comprises computer executable instructions for
    determining the system the navigation data relates to;
    selecting a mode for transmitting the assistance data;
    inserting indication of the navigation system and the selected mode into the assistance data; and
    constructing the assistance data according to the selected mode.

According to a seventh aspect of the present invention there is provided a signal for delivering assistance data to a device, the signal comprising
    assistance data relating to at least one navigation system;
characterised in that the signal further comprises
    an indication of the navigation system the assistance data relates to and a mode selected for transmitting the assistance data;
wherein said assistance data has been constructed according to the selected mode.

According to an eighth aspect of the present invention there is provided a carrier having a signal recorded thereon for delivering assistance data to a device, the signal comprising
    assistance data relating to at least one satellite navigation system;
characterised in that the signal further comprises an indication of the navigation system the assistance data relates to and a mode selected for transmitting the assistance data;

wherein said assistance data has been constructed according to the selected mode.

According to a ninth aspect of the present invention there is provided an assistance data server comprising a controlling element for forming assistance relating to at least one navigation system; and a transmitting element for transmitting assistance data to a communications network;

characterised in that the controlling element is adapted to select a mode for the transmission of the assistance data;

insert indication of the navigation system and the selected mode into the assistance data; and construct the assistance data according to the selected mode.

The invention shows some advantages over prior art. The format according to the invention is suitable for a number of cellular standards and for a number of GNSS systems. These characteristics make the current invention a very attractive solution since a globally applicable solution reduces implementation costs. This applies to handset manufacturers as well as to operators of communications networks and possible commercial assistance data service providers. The prior art implementation in RRLP and RRC only include the possibility to provide the Assisted GPS receiver with GPS assistance data. There has been no possibility to support Galileo, GLONASS, SBAS, LAAS or QZSS. This has been a drawback and can be corrected for using the present invention. Since Galileo assistance data will almost certainly be included in RRLP and RRC, there is now possibility to make this format as general as possible in order to able to support future systems also.

DESCRIPTION OF THE DRAWINGS

In the following, the invention will be described in more detail with reference to the appended drawings, in which.

DETAILED DESCRIPTION OF THE INVENTION

Figure 1:
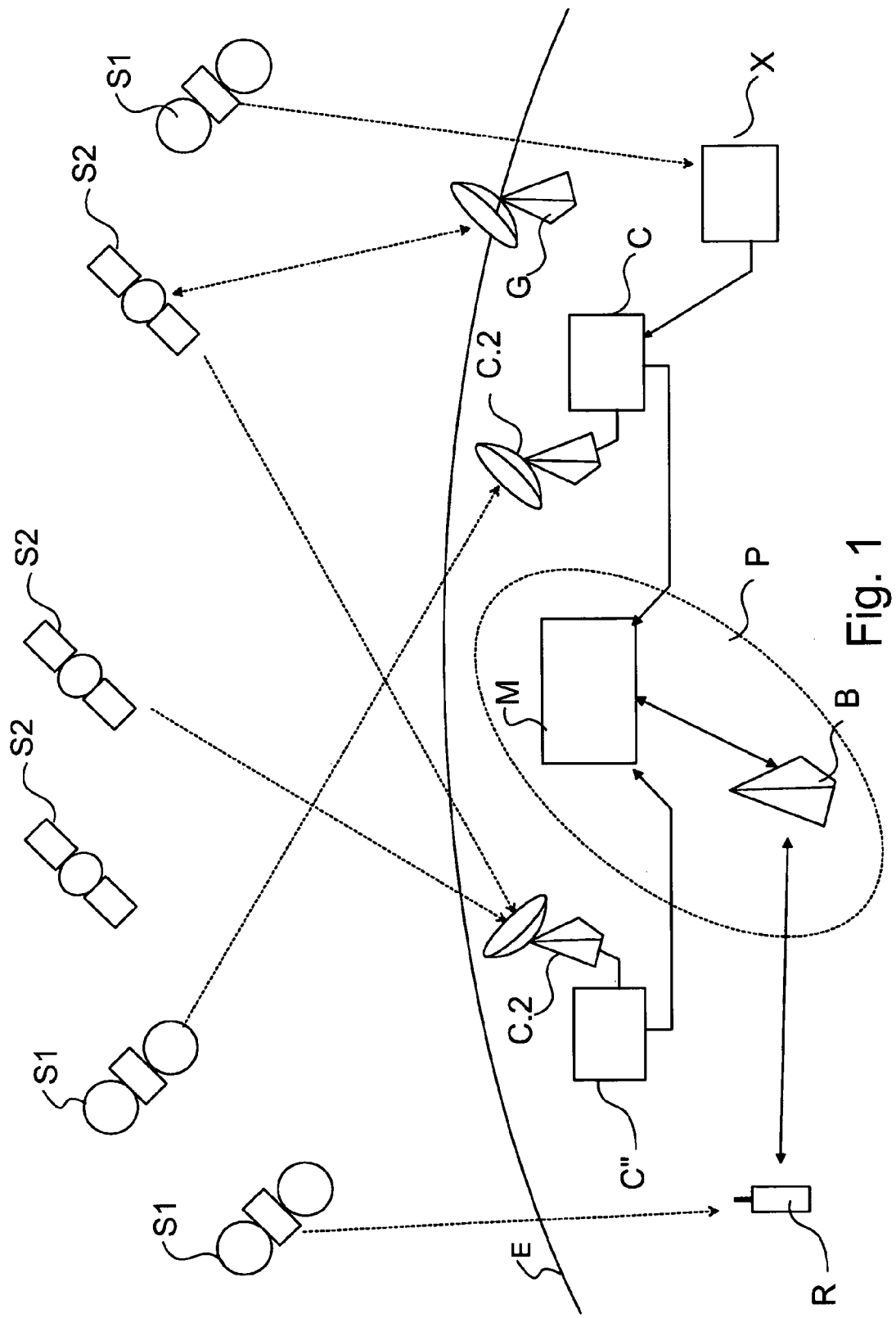
FIG. 1 depicts as a general, simplified diagram a system in which the present invention can be applied.

In FIG. 1 there is depicted an example of a system 1 which can be used for positioning a device R. The system 1 comprises reference stations S, such as satellites S1 of a first navigation system, for example the GPS, and satellites S2 of a second navigation system, for example the GLONASS. It should be noted here that GPS and GLONASS are only mentioned as non-limiting examples here and also other reference stations S than satellites can be used (e.g. pseudolites of the LAAS). Also the number of reference stations is greater than shown in FIG. 1. The navigation systems comprise one or more ground stations G. The ground station G controls the operation of the satellites S1, S2 of the navigation systems 2, 3, respectively. The ground station G can e.g. determine deviations of the orbits of the satellites and the accuracy of the clock(s) of the satellites (not shown). If the ground station G detects a need to correct the orbit or the clock of a satellite S1, S2, it transmits a control signal (or control signals) to the satellite S1, S2 which then performs a correction operation on the basis of the control signal(s). In other words, the ground station G refer to the Ground Segment of the navigation system.

During their operation, the satellites S1, S2 monitor the condition of their equipment. The satellites S1, S2 may use, for example, watchdog operations to detect and report possible faults in the equipment. The errors and malfunctions can be instantaneous or longer lasting. On the basis of the health data, some of the faults can possibly be compensated for, or the information transmitted by a malfunctioning satellite can be totally disregarded. The malfunctioning satellite S1, S2 sets a flag in a satellite health field of a navigation message indicative of a failure of the satellite. The satellite S1, S2 can also indicate in the navigation message a signal or signals which is/are not operating properly. It is also possible that the ground station G can detect that some satellite is not operating properly and set an indication of the malfunctioning signal(s) of that satellite. This indication can then be transmitted to the communications network P in a navigation message.

In this non-limiting example embodiment the communications network P is the GSM network and the network element M communicating with the reference receiver C, C" is the Mobile Switching Centre (MSC) of the GSM network. The reference receiver C can transmit assistance data to the network element M. The network element stores the assistance data to a memory M.4 (FIG. 3) for transmission to a device R when the device R needs the assistance data to perform assisted positioning operation. It is also possible to transmit the assistance data from the network element M to the device R before it is needed. For example, the device R can request the assistance data of all visible satellites and store the navigation data to the memory R.4 of the device R for later use.

The network element M can also be the Serving Mobile Location Centre (SMLC) of the GSM network. The Serving Mobile Location Centre is either a separate network element (such as the MSC) or integrated functionality in a base station B (BSC, Base Station Controller) that contains the functionality required to support location based services. The SMLC manages the overall co-ordination and scheduling of resources required for locating a device R. It also calculates the final location estimate and estimates the achieved accuracy. The SMLC may control a number of Location Measurement Units (LMU) for the purpose of obtaining radio interface measurements to locate or help locate the mobile station subscribers in the area that it serves.

Figure 2:
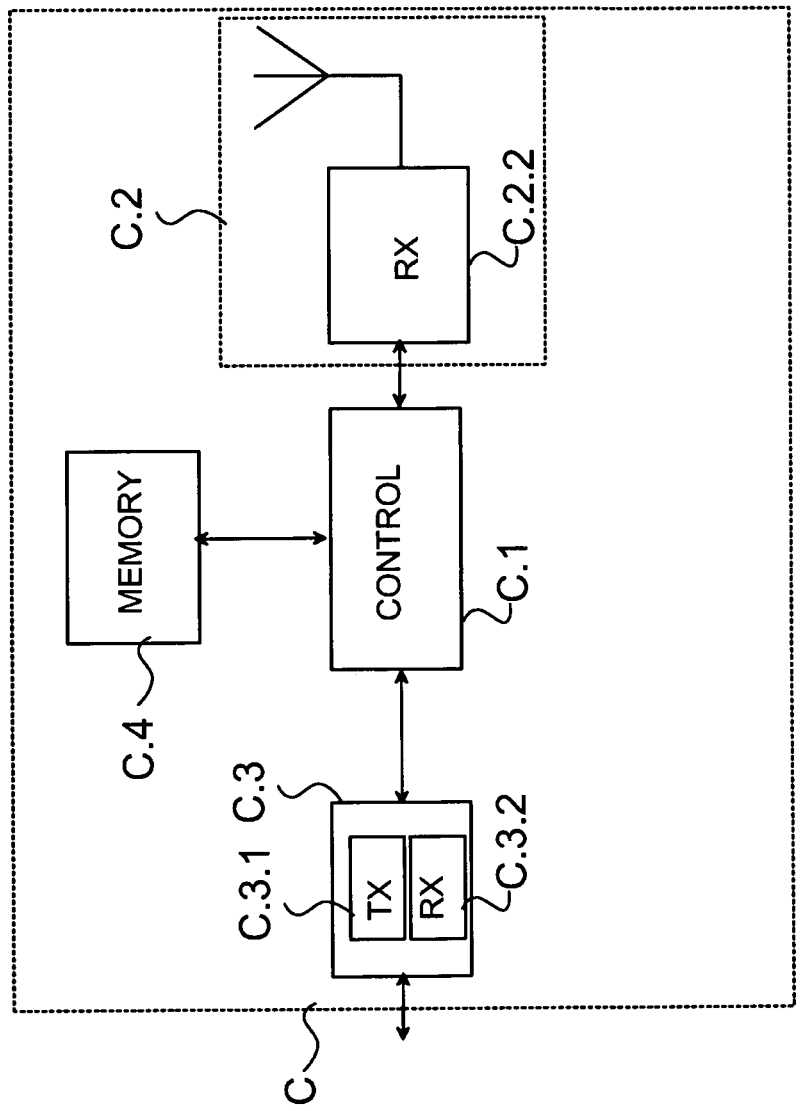
FIG. 2 depicts a reference receiver of a navigation system according to an example embodiment of the present invention as a simplified block diagram.

Now, the main elements of an example embodiment of the reference receiver C will be described in more detail with reference to FIG. 2. The disclosure is applicable to both the reference receiver C of the first navigation system and the reference receiver C" of the second navigation system, although practical implementations may be different from each other. The reference receiver C comprises a controller C.1 for controlling the operation of the reference receiver C. The controller C.1 comprises e.g. a processor, a microprocessor, a digital signal processor (DSP) or a combination of these. It is obvious that there can also be more than one processor, microprocessor, DSP, etc. in the controller C.1. There is also a reception block C.2 comprising a receiver C.2.2 for receiving signals from the satellites S1, S2 of the navigation system. The reference receiver C further comprises a communication block C.3 for communicating, either directly or indirectly, with the network element M of the communications network P. The communication block C.3 comprises a transmitter C.3.1 for transmitting signals to the network element M and, if necessary, a receiver C.3.2 for receiving signals transmitted by the network element M to the reference receiver C. The reference receiver C may also comprise memory C.4 for storing data and software (computer program code).

Figure 3:
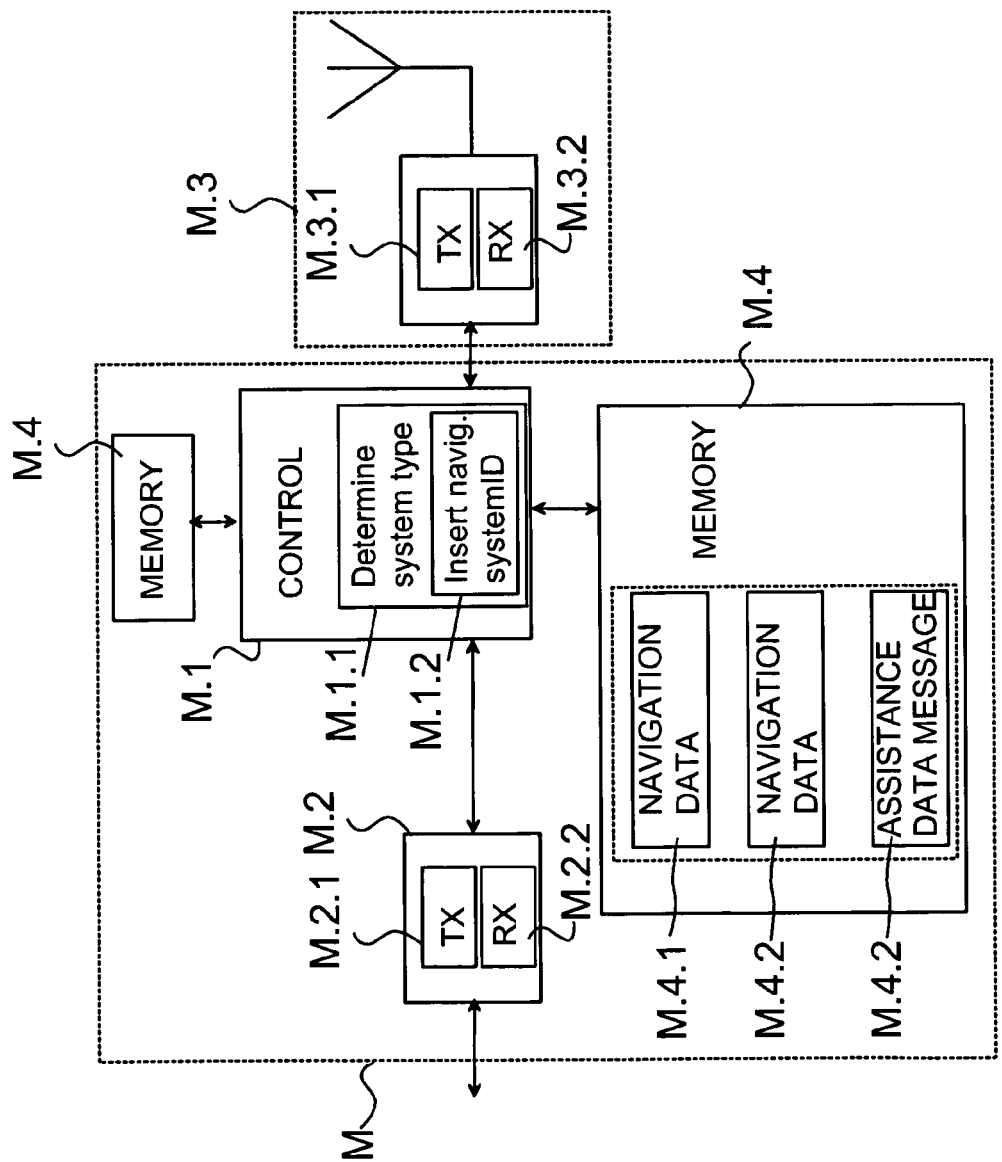
FIG. 3 depicts a network element according to an example embodiment of the present invention as a simplified block diagram.

The structure of an example embodiment of the network element M is depicted in FIG. 3. The network element M comprises a controller M.1. Also the controller M.1 of the network element may be constructed of a processor, a microprocessor, a digital signal processor (DSP) or a combination of these. It is obvious that there can also be more than one processor, microprocessor, DSP, etc. in the controller M.1. The network element M can communicate with the reference receiver C by the first communication block M.2. The first communication block M.2 comprises a receiver M.2.2 for receiving signals from the reference receivers C of the navigation systems. The first communication block M.2 may also comprise a transmitter M.2.1 for transmitting e.g. request messages to the reference receiver C of the navigation system. The network element M further comprises a second communication block M.3 for communicating with the base stations B or other access points of the communications network P. The second communication block M.3 comprises a transmitter M.3.1 for transmitting signals to the base stations B and a receiver M.3.2 for receiving signals transmitted by the base stations B to the network element M. The network element M also comprises memory M.4 for storing data and software (computer program code).

The network element M obtains the assistance data either from satellite broadcasts by using a reference receiver C or some other external solution, e.g. from an assistance data server X intended to gather and transmit such information to communications networks. The assistance data server X comprises analogous elements with the network element M with respect to the operations relating to the receiving navigation data, forming and transmitting the assistance data (i.e. the receiver M.2.2, the controller M.1, the transmitter M.3.1, the memory M.4). The assistance data server X may also comprise elements of the reference receiver C. The assistance data server X is, for example, a server of a commercial service provider from who assistance data can be requested, maybe against a fee.

Figure 4:
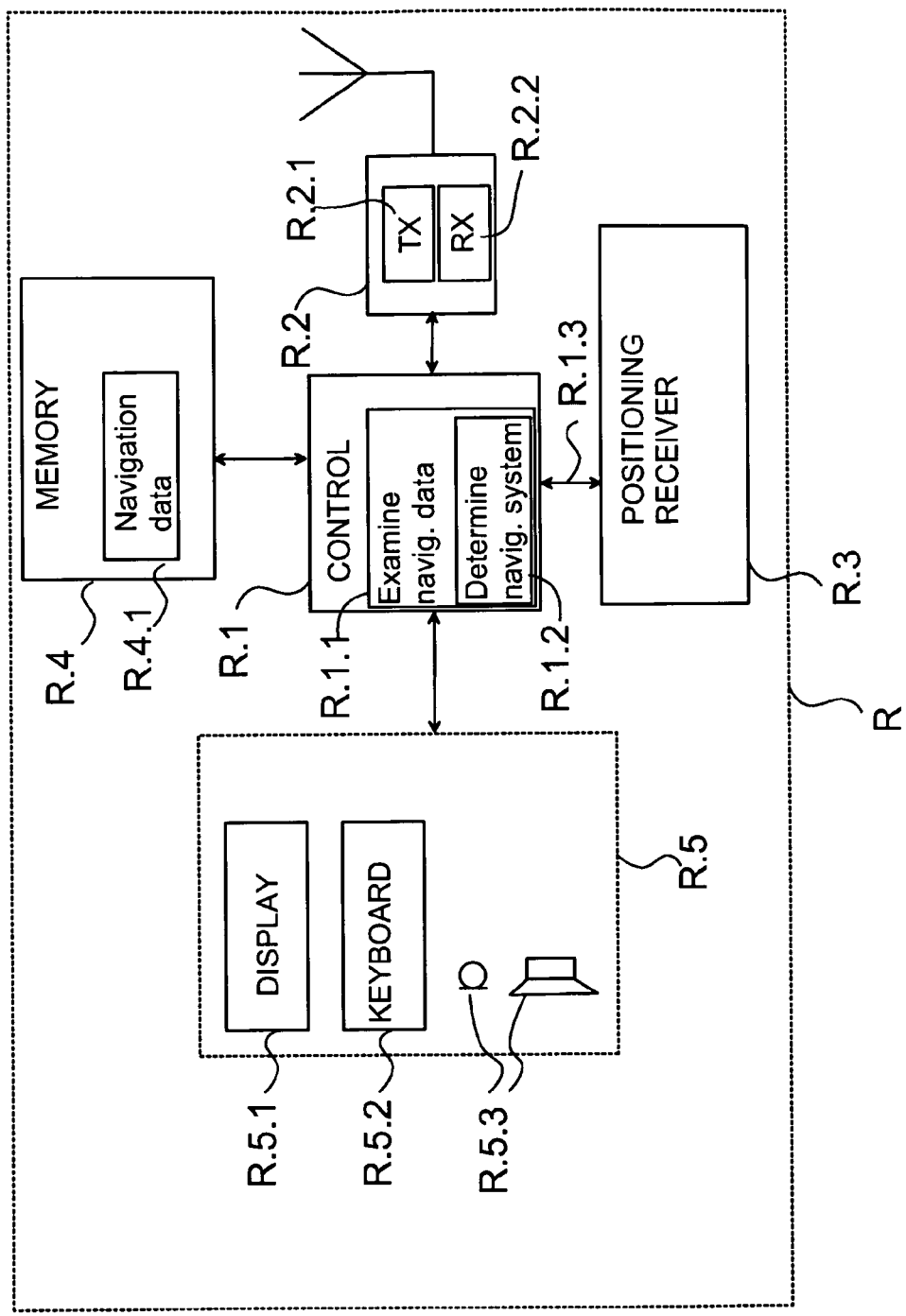
FIG. 4 depicts a device according to an example embodiment of the present invention as a simplified block diagram.

FIG. 4 depicts a device R according to an example embodiment of the present invention as a simplified block diagram. The device R comprises one or more positioning receivers R.3 for receiving signals from the reference stations S1, S2 of one or more navigation systems. There can be one positioning receiver R.3 for each navigation system the device R is intended to support, or it may be possible to use one positioning receiver R.3 for performing positioning on the basis of signals of more than one navigation system. The device R also comprises a controller R.1 for controlling the operation of the device R. Again, the controller R.1 of the network element may be constructed of a processor, a microprocessor, a digital signal processor (DSP) or a combination of these. It is obvious that there can also be more than one processor, microprocessor, DSP, etc. It is also possible that the positioning receiver R.3 can comprise a controlling element R.3.1 (e.g. a processor, a microprocessor and/or a DSP), or the positioning receiver R.3 uses the controller of the device R in positioning. It is also possible that some of the positioning operations are carried out by the controlling element R.3.1 of the positioning receiver R.3 and some other positioning operations are carried out by the controller R.1 of the device. The device R can communicate with a base station B of the communications network P by the communication block R.2. The communication block R.2 comprises a receiver R.2.2 for receiving signals from the base station B of the communications network P. The communication block M.2 also comprises a transmitter R.2.1 for transmitting messages to the base station B of the communications network P. Data and software can be stored to the memory R.4 of the device. The device R is also provided with a user interface R.5 (UI) which comprises, for example, a display R.5.1, a keypad R.5.2 (and/or a keyboard), and audio means R.5.3, such as a microphone and a loudspeaker. It is also possible that the device has more than one user interface.

The device R is, for example, a mobile communication device intended to communicate with the communications network P as is known as such. The user interface R.5 can be common to both the mobile communication part and the positioning receiver R.3.

In the following, a non-limiting example of the assistance data format fields are disclosed with reference to the Table 1 and FIG. 5. The orbit model problem has been solved by introducing a multi-mode model. The modes of the model are at least Mode 1: Keplerian model, which supports at least the GPS, Galileo, and QZSS systems; Mode 2: Position in ECEF-coordinates, which supports at least the LAAS system; and Mode 3: Position, velocity and acceleration in ECEF-coordinates, which supports at least the GLONASS, SBAS, and QZSS systems. There can also be more than three modes for future systems and different kind of implementations of the invention.

In the Table 1, associated bit counts, scale factors and different modes are shown. The explanations follow the Table.

TABLE 1

| Parameter | # Bits | Scale Factor | Units | Incl. |
|---|---|---|---|---|
| $(t_{oe}\_MSB)$ | 12 | $2^{20}$ | sec | |
| Satellite and Format Identification (once per model) | | | | |
| SS ID | $9^{(u)}$ | — | — | M |
| Carrier Frequency index | 5 | — | — | C |
| (Fit Interval) | 6 | — | h | C |
| (SV Health) | $8^{(u)}$ | — | Boolean | C |
| (IOD) | $11^{(u)}$ | — | — | C |
| Satellite Clock Model (once per model) | | | | |
| $(t_{oc})$ | $20^{(u)}$ | 1 | sec | C |
| $af_2$ | 18 | $2^{-65}$ | sec/sec$^2$ | C |
| $af_1$ | 16 | $2^{-43}$ | sec/sec | C |
| $af_0$ | 28 | $2^{-33}$ | sec | C |
| $(T_{GD})$ | 8 | $2^{-31}$ | sec | C |
| Satellite Navigation Model Using Keplerian Parameters (once per model) | | | | |
| $(t_{oe})$ | $20^{(u)}$ | 1 | sec | $C^{(1)}$, MODE 1 |
| $\omega$ | 32 | $2^{-31}$ | semi-circles | $C^{(1)}$, MODE 1 |
| $\Delta n$ | 16 | $2^{-43}$ | semi-circles/sec | $C^{(1)}$, MODE 1 |
| $M_0$ | 32 | $2^{-31}$ | semi-circles | $C^{(1)}$, MODE 1 |
| $\dot{\Omega}$ | 24 | $2^{-43}$ | semi-circles/sec | $C^{(1)}$, MODE 1 |
| e | $32^{(u)}$ | $2^{-33}$ | — | $C^{(1)}$, MODE 1 |
| $\dot{i}$ | 14 | $2^{-43}$ | semi-circles/sec | $C^{(1)}$, MODE 1 |
| $(A)^{1/2}$ | $32^{(u)}$ | $2^{-19}$ | meters$^{1/2}$ | $C^{(1)}$, MODE 1 |
| $i_0$ | 32 | $2^{-31}$ | semi-circles | $C^{(1)}$, MODE 1 |
| $\Omega_0$ | 32 | $2^{-31}$ | semi-circles | $C^{(1)}$, MODE 1 |
| $C_{rs}$ | 16 | $2^{-5}$ | meters | $C^{(1)}$, MODE 1 |
| $C_{is}$ | 16 | $2^{-29}$ | radians | $C^{(1)}$, MODE 1 |

TABLE 1-continued

| Parameter | # Bits | Scale Factor | Units | Incl. |
|---|---|---|---|---|
| $C_{us}$ | 16 | $2^{-29}$ | radians | $C^{(1)}$, MODE 1 |
| $C_{rc}$ | 16 | $2^{-5}$ | meters | $C^{(1)}$, MODE 1 |
| $C_{ic}$ | 16 | $2^{-29}$ | radians | $C^{(1)}$, MODE 1 |
| $C_{uc}$ | 16 | $2^{-29}$ | radians | $C^{(1)}$, MODE 1 |
| Satellite Navigation Model Using ECEF Coordinates (once per model) | | | | |
| $(t_{oe})$ | $20^{(u)}$ | 1 | sec | $C^{(2)}$, MODE 2 & 3 |
| X MSB | 27 | 1 | meters | $C^{(2)}$, MODE 2 & 3 |
| Y MSB | 27 | 1 | meters | $C^{(2)}$, MODE 2 & 3 |
| Z MSB | 27 | 1 | meters | $C^{(2)}$, MODE 2 & 3 |
| X LSB | $8^{(u)}$ | $2^{-8}$ | meters | $O^{(2)}$, MODE 2 & 3 |
| Y LSB | $8^{(u)}$ | $2^{-8}$ | meters | $O^{(2)}$, MODE 2 & 3 |
| Z LSB | $8^{(u)}$ | $2^{-8}$ | meters | $O^{(2)}$, MODE 2 & 3 |
| X' | 26 | $2^{-12}$ | meters/sec | $O^{(2)}$, MODE 3 |
| Y' | 26 | $2^{-12}$ | meters/sec | $O^{(2)}$, MODE 3 |
| Z' | 26 | $2^{-12}$ | meters/sec | $O^{(2)}$, MODE 3 |
| X" | 19 | $2^{-22}$ | meters/sec$^2$ | $O^{(2)}$, MODE 3 |
| Y" | 19 | $2^{-22}$ | meters/sec$^2$ | $O^{(2)}$, MODE 3 |
| Z" | 19 | $2^{-22}$ | meters/sec$^2$ | $O^{(2)}$, MODE 3 |
| Satellite Position Accuracy Model (once per model) | | | | |
| $(r_0)$ | $5^{(u)}$ | — | meters | C |
| $(r_1)$ | $5^{(u)}$ | $2^{-18}$ | meters/sec | O |

NOTE 1:
All of these fields shall be present together, or none of them shall be present.
NOTE 2:
All of these fields shall be present only if position information for a specific satellite is given in ECEF frame, or none of them shall be present if position information for a specific satellite is given in Keplerian parameters.
NOTE u:
unsigned parameter The Table 1 discloses examples of the fields and different modes 1, 2 and 3. The information of Table 1 can be divided into six sections. The first section contains one field $t_{oe}\_MSB$, which specifies the 12 most significant bits (MSBS) of the time of ephemeris $t_{oe}$ and the reference time for the clock model $t_{oc}$ given in UTC Time (Universal Time Coordinated). The device R should compensate for the possible rollover in the time of ephemeris $t_{oe}$ and the reference time for the clock model upon reception of the navigation model. The time of ephemeris $t_{oe}$ and the reference time for the clock model $t_{oc}$ have a time span of about 1.7 weeks.

The second section relates to satellite and format identification. The second section exists once each mode in an assistance message A (FIG. 5). The first field of the second section contains the System and Satellite Identification SS_ID. The System and Satellite Identification is used to define different satellites and satellite systems. The System and Satellite Identification SS_ID is, in this non-limiting example, a 9-bit field divided to 2 subfields. The first subfield (System ID) contains the ID number of the satellite system, and the second subfield (SV/Slot ID) contains the index of the satellite in the system for which the navigation data follows. The bit masks for the System and Satellite Identification SS_ID are, in this example, the following:

System ID (3 bits, value range 0 . . . 7) xxx-----
SV/Slot ID (6 bits, value range 0 . . . 63) ---xxxxxx In other words, the three most significant bits indicate the satellite system and the last six bits indicate the satellite.

The specification for the system ID is disclosed in Table 2.

TABLE 2

| System ID | System ID value |
|---|---|
| GPS | 0 |
| SBAS | 1 |
| Galileo | 2 |
| GLONASS | 3 |
| QZSS | 4 |
| LAAS | 5 |
| Reserved for future use | 6 |
| Reserved for future use | 7 |

SV/Slot ID is the satellite index in the broadcasted navigation model.

The second field of the second section contains Carrier Frequency Index. This parameter is a GLONASS specific frequency channel index (the map between the satellite index indicating a slot in the orbit and the navigation signal frequency. This map is included in the GLONASS almanac broadcast). It is set to 0 for any other system than GLONASS. Value range for this field is [−7, −13].

The third field of the second section contains Fit Interval. This field specifies the validity period of the navigation model. Value range for this field is 0.125-448 h. This parameter is specified according to a special floating-point representation as described in the Table 3 below.

TABLE 3

| Exponent, e (3 bits) | Mantissa, m (3 bits) | Floating-Point value, x | Fit Interval Value, F |
|---|---|---|---|
| 0 | 0 | 0.125 | F < 0.125 h |
| 0 | 1 | 0.25 | F = 0.25 h |
| 0 | 1 < m < 8 | $(m + 1) * 2^{-3}$ | F = {0.375 h, 0.5 h, 0.625 h, 0.75 h, 0.875 h, 1.0 h} |
| 1 < e < 7 | 0 <= m < 8 | $(m + 1) * 2^{(e-1)}$ | F = x h |
| 7 | 0 <= m < 7 | $(m + 1) * 2^{(e-1)}$ | F = x h |
| 7 | 7 | 512 | F = Infinite |

The Fit Interval value of 63 (=$2^6$−1) has a special meaning that defines infinite interval for the Navigation Model of the specific satellite.

The fourth field of the second section contains SV Health. This parameter gives information about the satellite's current health. The health values are GNSS system specific (see for instance ICD-GPS-200).

The fifth field of the second section contains Issue Of Data. Issue of Data field contains the identity for the Navigation Model. In the case of, for instance, broadcasted GPS ephemeris, the 10 least significant bits (LSB) of IOD contain the IODC index as described in GPS-ICD-200. The MSB of IOD is set if the Navigation Model is not based on any broadcasted ephemeris, but is based on long-term fit that is provided from a source external to the navigation systems.

The third section relates to the Satellite Clock Model. The first field of the third section contains $t_{oc}$, which informs least significant bits of the reference time for the clock model. The 12 MSBs are included in the first section in the field $t_{oe}\_MSB$. The second $a_{f2}$, third $a_{f1}$ and fourth field $a_{f0}$ of the third section contain $2^{nd}$, $1^{st}$ and $0^{th}$ order coefficients for the clock model.

The fifth field of the third section contains $T_{GD}$, which indicates equipment group delay between L1 and L2 broadcasts. This parameter is defined for GPS and GLONASS systems.

The fourth section relates to the first mode, which is the Satellite Navigation Model Using Keplerian Parameters.

The navigation model as defined by using the Keplerian parameters is the same as defined for GPS in GPS-ICD-200. This set of parameters is used in the mode 1, i.e. with assistance data relating to satellites of the GPS and Galileo systems. The explanation of the model parameters is given in the Table 4 below.

TABLE 4

| Parameter | Explanation |
|---|---|
| $t_{oe}$ | Time of ephemeris |
| | See the explanation for $t_{oe\_MSB}$. |
| e | Eccentricity |
| $(A)^{1/2}$ | Square-root of semi-major axis |
| $M_0$ | Mean anomaly |
| $\Omega_0$ | Longitude of the ascending node |
| $i_0$ | Inclination @ $t_{oe}$ |
| $\omega$ | Argument of perigee |
| $\Delta n$ | Mean motion correction |
| $\dot{\Omega}$ | Rate of change of longitude of the ascending node |
| $\dot{i}$ | Rate of change of inclination |
| $C_{us}$ | Sine correction of latitude |
| $C_{uc}$ | Cosine correction of latitude |
| $C_{rs}$ | Sine correction of radius |
| $C_{rc}$ | Cosine correction of radius |
| $C_{is}$ | Sine correction of inclination |
| $C_{ic}$ | Cosine correction of inclination |

Keplerian parameters are the native format for GPS and Galileo. However, the native format for GLONASS and SBAS differs from the format used by GPS and Galileo. Although it is possible, by using history data on orbits, to convert GLONASS and SBAS format to GPS/Galileo-type orbit model, it is advantageous to allow for the native GLONASS and SBAS broadcasted orbit model format to be included in the generalized model. This is advantageous from the LAAS point-of-view as well, since representing a stationary object with Keplerian parameters would require adding significant number of bits to parameters $\Delta n$ and $\dot{\Omega}$, if the pseudolite were to be kept substantially stationary. Moreover, Keplerian parameters can only present the object position at an accuracy of few cm. However, with pseudolites it is essential to have a sub-cm resolution (i.e. resolution smaller than 1 cm) in order to be able to obtain the best possible navigation solution. The use of GLONASS/SBAS native format in the model allows for representing the position of a LAAS transmitter in plain ECEF-coordinates without additional format conversions.

The fifth section relates to the second and third mode, which are the Satellite Navigation Models Using ECEF Coordinates.

This set of parameters is used in the mode 2 (i.e. for LAAS) and mode 3 (i.e. for GLONASS and SBAS).

TABLE 5

| Parameter | Explanation | Modes |
|---|---|---|
| $t_{oe}$ | Time of ephemeris | 2, 3 |
| | See the explanation for $t_{oe\_MSB}$. | |
| X MSB | MSB of the x-coordinate in the ECEF frame | 2, 3 |
| Y MSB | MSB of the y-coordinate in the ECEF frame | 2, 3 |
| Z MSB | MSB of the z-coordinate in the ECEF frame | 2, 3 |
| X LSB | LSB of the x-coordinate in the ECEF frame | 2, 3 |
| Y LSB | LSB of the y-coordinate in the ECEF frame | 2, 3 |
| Z LSB | LSB of the z-coordinate in the ECEF frame | 2, 3 |
| X' | x-velocity in the ECEF frame | 3 |
| Y' | y-velocity in the ECEF frame | 3 |
| Z' | z-velocity in the ECEF frame | 3 |
| X" | x-acceleration in the ECEF frame | 3 |
| Y" | y-acceleration in the ECEF frame | 3 |
| Z" | z-acceleration in the ECEF frame | 3 |

TABLE 5-continued

| Parameter | Explanation | Modes |
|---|---|---|

The number of most significant bits (MSB) in the position field is chosen so that GLONASS and SBAS range requirements are met. However, the number of MSB is also sufficient to represent QZSS orbits if required.

The number of LSB, on the other hand, represents the resolution requirement set by LAAS (resolution 3.9 millimeters).

The sixth section relates to the Satellite Position Accuracy Model. It contains two fields. The first field contains the parameter $r_0$, while the second field contains the parameter $r_1$. These parameters can be used to describe the navigation model error propagation in time by $Error(t)=r_0+r_1 \cdot (t-t_{REFERENCE})$.

For GPS the parameter $r_0$ is the URA (User Range Accuracy) value as described in GPS-ICD-200 specification.

When it is necessary to transmit the navigation system assistance data message in the communications network, e.g. from the network element M to the device R, the information is mapped into one or more messages applicable in the communications network. For example, in GSM communications network there is a certain message delivery approach (Radio Resource Location Services Protocol, RRLP) formed for transmission of location related information. This approach is defined in the standard 3GPP TS 44.031, which defines the format of the assisted GPS data exchanged between the network element M and the device R. In this invention, this approach can be used to send the more general health data to the device R.

In the network element M the available navigation information such as DGPS correction, ephemeris and clock correction and almanac data is mapped into corresponding fields of the assistance data message(s). The ephemeris, clock correction, almanac and other data relating to a particular satellite are obtained from a satellite navigation message of that satellite or from an external service X. The message is received by the reference receiver C or by a reference receiver in the external service module X. The assistance data message comprises a Cipher Control element to indicate if the information is ciphered or not, Ciphering Serial Number element, and Data Information Element. The Data Information Element (Data IE) carries the navigation information. The elements are depicted in Table 6 below.

The Assistance Data message is built so that it is fitted into a fixed length message not necessary occupying the whole message. It can contain three data sets: DGPS correction, ephemeris and clock correction, almanac and other data information. In case that the fixed length message has less information elements than bits available then the rest of the message is filled with fill bits. Undefined spare bits are usually not allowed between elements. In an example embodiment the channel to broadcast the Assistance Data message is e.g. CBCH (Control Broadcast Channel) over which the SMSCB DRX (Short Message Service Cell Broadcast, Discontinuous Reception) service is used. One SMSCB message has fixed information data length of 82 octets and the maximum length of GPS Assistance Data is 82 octets. The device R can identify the LCS SMSCB message with Message Identifiers declared in 3GPP TS 23.041.

TABLE 6

| Parameter | | Bits | Resol. | Range | Units | Occurrences | Presence |
|---|---|---|---|---|---|---|---|
| Cipher Control | Cipher On/Off | 1 | — | 0-1 | — | 1 | M |
| | Ciphering Key Flag | 1 | — | 0-1 | — | 1 | M |
| | Ciphering Serial Number | 16 | — | 0-65535 | — | 1 | C |
| | Data | 638 | — | — | — | — | M |

Figure 5:
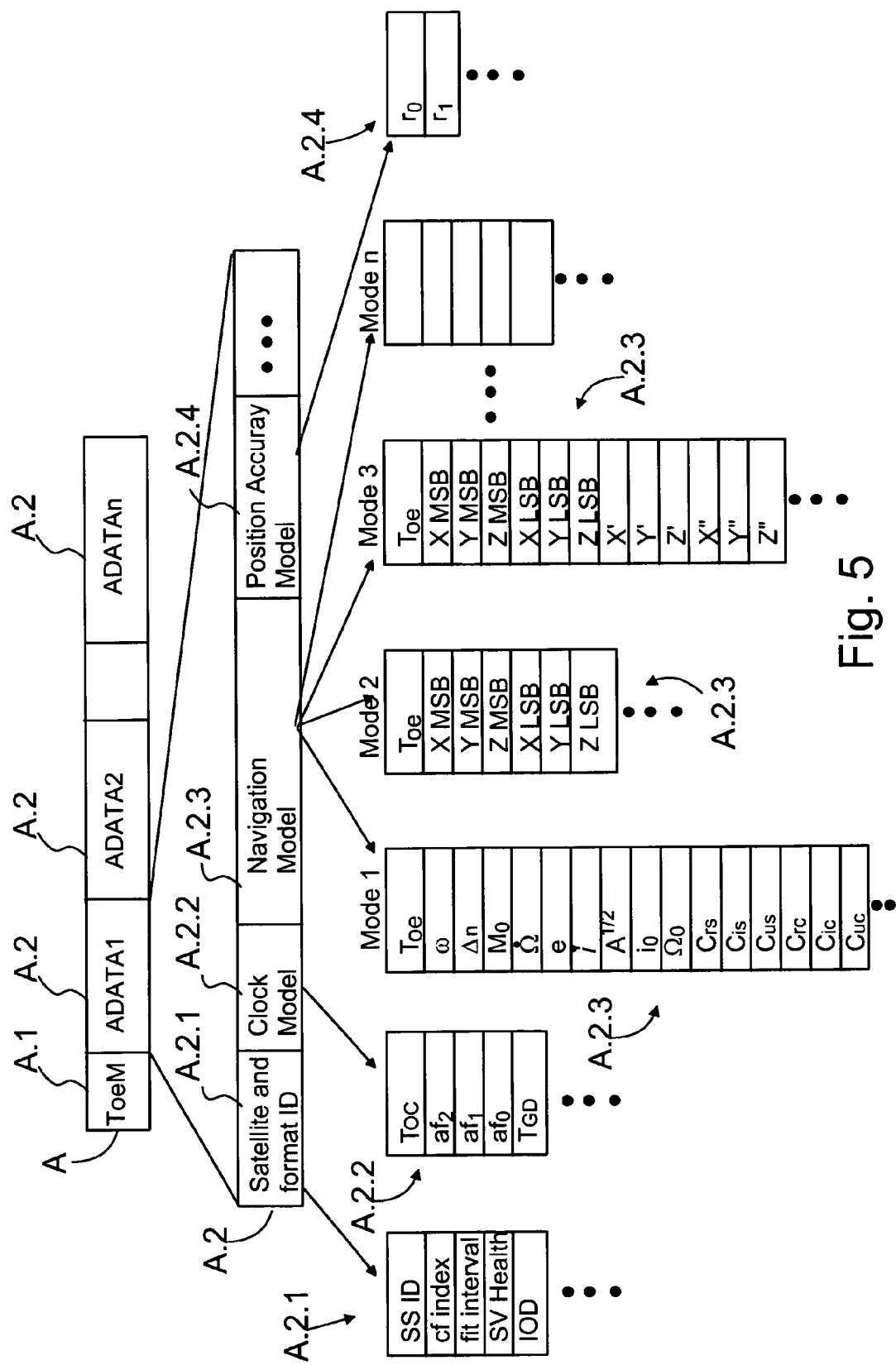
FIG. 5 depicts according to an example embodiment of the present invention.
Figure 6:
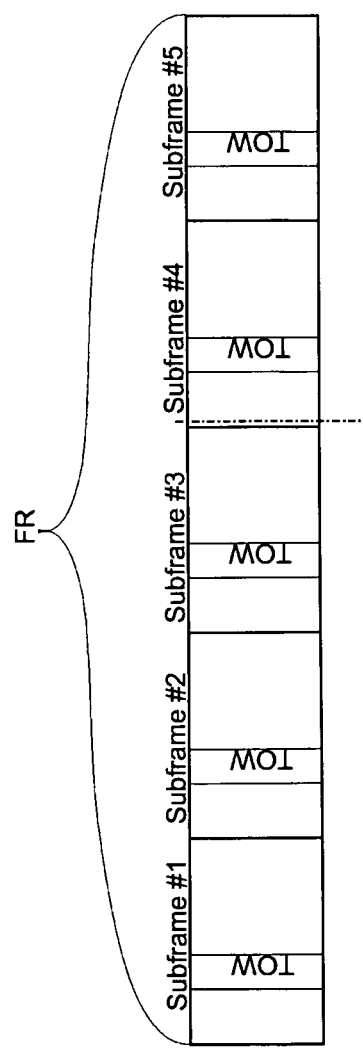
FIG. 6 shows an example of a frame structure used in the GPS system.

In FIG. 5 an example assistance message A according to an example embodiment of the present invention is shown. The message comprises the $t_{oe\_}$ MSB, i.e. the 12 most significant bits (MSBs) of the time of ephemeris $t_{oe}$ and the reference time for the clock model $t_{oc}$ given in UTC Time. That parameter is followed by a number of assistance data records A.2 (ADATA1, ADATA2, ..., ADATAn). Each assistance data record A.2 contains assistance data relating to one satellite S1, S2 of a navigation system. As a non-limiting example, the first and second data record of the message A could contain assistance information of two satellites of the GPS system and the third data record of the message A could contain assistance information of one satellite of the Galileo system.

The structure of the assistance data record A.2 is depicted below the message A in FIG. 5. The assistance data record A.2 comprises e.g. the Satellite and Format Identification record A.2.1, the Clock Model record A.2.2, the Navigation Model record A.2.3, and the Position Accuracy Model record A.2.4. It is also possible to define more or less records for the assistance data record A.2 than these four different records A.2.1, ..., A.2.4.

The structure of the Navigation Model record A.2.3 is also depicted in FIG. 5 and it contains the fields of the third section of Table 1 as disclosed above in more detail. For example, if the assistance data of the Navigation Model record A.2.3 contained data on GPS, Galileo or QZSS system, the structure indicated by Mode 1 in FIG. 5 could be used. Respectively, if the assistance data of the Navigation Model record A.2.3 contained data on LAAS system, the structure indicated by Mode 2 in FIG. 5 could be used, and, if the assistance data of the Navigation Model record A.2.3 contained data on GLONASS or SBAS system, the structure indicated by Mode 3 in FIG. 5 could be used. It may also be possible to use e.g. the structure of Mode 3 with satellites of the QZSS system.

It should be noted here that each Navigation Model record A.2.3 of the assistance message A should contain all the fields of the respective mode. The mode selection can be based on the navigation system the parameters relate to, or another selection criteria can be used to select the mode for transmission of the assistance data, wherein the selected mode is not necessarily dependent on the navigation system.

Now, an example situation on the usage of the assistance message format according to the present invention will be described in the following. The network element has storage area M.4.1 in the memory M.4 for storing navigation data received from the reference receiver C. If there is no navigation data stored e.g. of the satellites of the first navigation system, the controller M.1 of the network element forms a query message (not shown) and transfers it to the first communication block M.2 of the network element. The transmitter M.2.1 makes protocol conversions, if necessary, to the message and transmits the message to the reference receiver C of the first navigation system. The receiver C.3.2 of the second communication block of the first reference receiver C receives the message, makes protocol conversions, if necessary, and transfers the message to the controller C.1 of the reference receiver C. The controller C.1 examines the message and determines that it is a request to transmit navigation data to the network element M. If the memory C.4 contains the requested navigation data, it can be transmitted to the network element M, unless there is a need to update the navigation data before the transmission.

After the navigation data is updated, the controller C.1 of the reference receiver forms a message containing the navigation data and transfers it to the transmitter C.3.1 of the second communication block of the first reference receiver C. The transmitter C.3.1 transmits, after protocol conversions if necessary, the navigation data to the network element M. The receiver M.2.2 of the network element receives the message, makes protocol conversions, if necessary, and transfers the message to the controller M.1 of the network element, or stores the navigation data received in the message directly to the memory M.4 of the network element. The memory may comprise certain areas (M.4.1, M.4.2 in FIG. 3) for storing navigation data of satellites of different navigation systems. Hence, the data is stored to the area which is reserved for the navigation system from which the navigation data was received.

The assistance data can be transmitted to the device R for example by request or by a broadcast transmission, e.g. on a control channel of the communications network P. In the GSM system a GPS Assistance Data Broadcast Message format is defined which can be used in such broadcast transmissions for GPS. The assistance data is included in the message utilising the format defined in this invention. For example, the controller M.1 of the network element M examines which kind of navigation data there is stored in the memory M.4. If, for example, the memory comprises navigation data of one or more satellites of the first navigation system and navigation data of one or more satellites of the second navigation system, the controller M.1 can construct the assistance message A in the assistance data message storage area M.4.3 in the memory M.4 e.g. in the following way. The controller M.1 retrieves the time of ephemeris $t_{oe}$ from the navigation data and stores the 12 most significant bits of the time of ephemeris into first field A.1 of the message A.

It should be noted here that the definition of time in this assistance data format is different from the present GPS time. As mentioned earlier, for instance, GPS time rolls over every week. The new time definition does not do this. Moreover, the manner in which time is defined is not relevant from the point of view of the invention.

Then, the controller browses the navigation data of the first navigation system stored in the first storage area M.4.1 to form the first assistance data record A.2 (ADATA1). The controller M.1 determines (M.1.2) the type of the system and sets (M.1.1) the first three bits of the SS_ID field in the Satellite and Format Identification record A.2.1 accordingly. The other six bits are set on the basis of the number of satellite the navigation data of which is in question. In a corresponding way the other fields of the Satellite and Format Identification record A.2.1 are filled. Also the fields of the Clock Model record A.2.2 are filled on the basis of the reference time and the coefficients of the clock model. The equipment group delay $T_{GD}$ between L1 and L2 broadcasts is filled if the assistance data relates to a satellite of the GPS or GLONASS system. The parameter $T_{GD}$ may be needed in other systems as well.

The usage of the Navigation Model records A.2.3 depends on the navigation system i.e. the controller M.1 selects one of the available modes Mode 1, Mode 2, Mode 3 or some other additional mode not mentioned here.

The Position Accuracy Model record A.2.4 is also filled to inform the navigation model error propagation in time.

If there is navigation data of another satellite of the first navigation system in the memory M.4, the controller M.1 of the network element forms the second assistance data record A.2 (ADATA2) accordingly.

When assistance data records A.2 are formed from the navigation data stored in all the navigation data storage areas M.4.1, M.4.2, the assistance data message can be transmitted to the communications network. The controller M.1 transfers the data in the assistance data message storage area M.4.3 to the second communication block M.3 of the network element. The transmitter M.3.1 of the second communication block of the network element M performs the necessary operations for forming the signals for transmission carrying the assistance data, and transmits the signals to the communications network P.

The signals are received by the receiver R.2.2 of the communication block of the device R. The receiver R.2.2 demodulates the data from the received signals and e.g. transfers the data to the controller R.1 of the device R. The controller R.1 stores the data into the memory R.4 of the device R and examines (R.1.1) the assistance data. The examination comprises determining the mode of each received assistance data record. The examination may also comprise determining (R.1.2) the navigation system. Indication on the mode can be transferred to the positioning receiver R.3 e.g. through the output line R.1.3 of the controller R.1. However, it is also possible that the controller R.1 is also used in the positioning operations wherein it may not be necessary to transfer the data (the mode and the assistance data) to the positioning receiver R.3 but the controller R.1 can use the data stored in the memory R.4.

The memory R.4 can comprise a storage area R.4.1 for storing the navigation data received in the assistance data messages. Navigation data can also be received, in some circumstances, from satellites by demodulating received satellite signals.

When the assistance data is retrieved from the assistance data record(s), they can be kept in the memory and used in the positioning. For example, when the positioning receiver R.3 can only demodulate signals from one or two satellites, the positioning receiver R.3 can use the assistance data for performing the positioning as is known as such.

The device R can perform the positioning at certain intervals, or when a predetermined condition is fulfilled. The predetermined condition can include, for example, one or more of the following situations: the user initiates to a call e.g. to an emergency centre; the user selects a positioning operation from a menu of the device R; the device R and the communications network P perform a handover to another cell of the communications network P; the communications network P sends a positioning request to the device R; etc.

It is also possible that the communications network, e.g. the network element M requests the device R to perform positioning. The request can be sent using the RRLP message delivery mechanism. Also the reply can be sent using the RRLP message delivery mechanism.

When the positioning is to be performed, the positioning receiver R.3 or the controller R.1 of the device can examine whether there is enough up-to-date navigation data stored in the memory R.4. If some navigation data is not up-to-date (i.e. the navigation data has become older than a preset time), or some necessary navigation data is missing, the device can form and send a request message to the communications network P, for example to the base station B, which forwards the request message to the network element M. The network element M gathers the requested navigation data and forms a reply message. The reply message is then transmitted via the serving base station B to the device R. The receiver R.2.2 of the communication block R.2 of the device receives and demodulates the reply message to retrieve the navigation data. The navigation data is stored e.g. into the navigation data storage area R.4.1 of the memory R.4.

In another embodiment of the present invention the network element M performs at least some of the positioning calculation in this embodiment the device R assists the network element M by performing e.g. carrier-phase measurements and transmitting the measurement results to the network element M in a measurement information message (GNSS measurement information). The network element M also forms assistance data by receiving navigation data from a reference receiver C or the network element M receives the assistance data from the assistance data server X. Then, the network element M calculates the position of the device R by using the measurement data and assistance data. Another option is that the position calculation is performed in another server (not shown) wherein the network server M transmits the measurement results and the assistance data to the another server.

In a yet another embodiment the device R performs pseudorange measurements and transmits the measurement results to the network element M in a measurement information message (GNSS measurement information). The network element M uses the measurement results and assistance data formed by the network element M or received from the assistance data server X. Then, the network element M calculates the position of the device R by using the pseudorange measurement data and assistance data, or the network element M transmits the pseudorange measurement data and assistance data to another server (not shown), which performs the position calculations.

In these above mentioned embodiments the measurement information transmitted from the device R to the network element M may depend on the navigation system but still the principles presented above can be used for forming a general message, which is independent on the navigation system.

The core of the invention is in the multi-mode functionality. The satellite system (GPS, Galileo, GLONASS, SBAS, LAAS, QZSS, or some other) that is indicated by the MSBs of the SS index, may define the mode. However, the mode may also be decided by using other factors. The mode then defines the orbit model mode and in certain implementations also the clock model mode.

Clearly, the method of indexing satellites (i.e. the navigation model identification contains information on the system and the SV) is an essential element in the invention. For GLONASS, Carrier Frequency Index is vital (in addition to the SS index).

It is noteworthy that the clock model is common for all the modes (and therefore for all the navigation systems) in this example implementation. However, the clock model may also change with the mode.

It should be noted that the navigation assistance message specified contains various items (specifically, $t_{oe}$_MSB, fit interval, SV health, IOD, $t_{oc}$, $T_{GD}$, $t_{oe}$, $r_0$, $r_1$) that are, of course, important for the navigation model to function properly, but are not important from the point-of-view of this invention (these parameters are in brackets in the table defining the format). For instance, the reference time for the model can be given in various ways (now, $t_{oe}$_MSB, $t_{oc}$ and $t_{oe}$), but changing it does not affect the multi-mode functionality. As another example, the fit interval is defined as a floating point value (Table 3 above). This is just an example and the fit interval can also be specified in some other means taking system specific issues into account. The parameters, which are not important from the point-of-view of the current invention, are only given for the sake of completeness.

Also, it should be emphasized that the actual bit counts and scale factors are subject to change, if new specifications or clarifications should appear. Changing the bit counts and/or scale factors does not change the spirit of the invention. For instance, adding resolution to velocity components would not be a different invention. As a yet another example, consider the SS ID. The indexing method currently used in standards is able to differentiate only between GPS satellites. The now proposed SS ID contains information on the system and the satellite. These two can be expressed in the same field, but it is not necessary to do so (given that the system is defined in some other field). Hence, a simple modification of the fields would not, again, change the spirit of the invention.

The communications network P can be a wireless network, a wired network, or a combination of these. Some non-limiting examples of the communications networks have already been mentioned above but WLAN and WiMax networks can also be mentioned here.

The operations of the different elements of the system can mostly be carried out by software, i.e. the controllers of the elements operate on the basis of computer instructions. It is, of course, possible that some operations or parts of them can be "hard coded" i.e. implemented by hardware.

The invention claimed is:

1. A network element comprising
   a controlling element for forming assistance data of a generalized navigation model including at least one clock model and at least one orbit model to be used to characterize satellite clock behaviour and satellite orbit in more than one navigation system, wherein said assistance data contains an indication of the navigation system to which said assistance data applies; and
   a transmitting element for transmitting the assistance data to a communications network; and
   further wherein the controlling element selects a format of the assistance data for the transmission of the assistance data; and
   constructs the assistance data according to the selected format.

2. The network element according to claim 1, wherein the network element further comprises
   a memory for storing navigation data of the at least one satellite navigation system; and
   an examining element adapted to examine the navigation data to determine the navigation system the navigation data relates to.

3. The network element according to claim 2, wherein the controlling element is adapted to form said assistance data on the basis of the navigation data.

4. The network element according to claim 2, wherein the network element also comprises a receiver for receiving navigation data of the at least one satellite navigation system.

5. The network element according to claim 2, wherein said navigation data also comprises an indication on the satellite the navigation data relates to, wherein the determining element is also adapted to insert indication on the satellite into the assistance data.

6. The network element according to claim 1, wherein said assistance data comprises one or more assistance data records.

7. The network element according to claim 1, wherein the assistance data record has at least one of the following formats:
   a Keplerian model;
   Position in Earth-Centered Earth Fixed-coordinates; or
   Position, velocity and acceleration in Earth-Centered Earth Fixed-coordinates.

8. The network element according to claim 1, wherein the communications network is a cellular network.

9. The network element according to claim 1, wherein the network element is a mobile switching centre of a GSM system.

10. The network element according to claim 1, wherein said assistance data relates to at least one of the following:
    the Global Positioning System;
    the GLONASS;
    the Galileo;
    the Quasi-Zenith Satellite System;
    a Space Based Augmentation System; or
    a Local Area Augmentation System.

11. The network element according to claim 1, wherein the controlling element is adapted to select the format of the assistance data on the basis of the navigation system the assistance data relates to, wherein said indication of the navigation data also indicates the selected format of the assistance data.

* * * * *